United States Patent
Ngo et al.

(10) Patent No.: US 9,203,931 B1
(45) Date of Patent: Dec. 1, 2015

(54) PROXY SERVER TESTING

(71) Applicant: Amazon Technologies, Inc., Reno, NV (US)

(72) Inventors: Choi Yong Ngo, Issaquah, WA (US); Mikhail Khasanov, Mountlake Terrace, WA (US); Ramakrishnan Hariharan Chandrasekharapuram, Seattle, WA (US); Vijay Pratap Singh, Seattle, WA (US); Carlos Alejandro Arguelles, Shoreline, WA (US)

(73) Assignee: Amazon Technologies, Inc., Reno, NV (US)

( * ) Notice: Subject to any disclaimer, the term of this patent is extended or adjusted under 35 U.S.C. 154(b) by 270 days.

(21) Appl. No.: 13/854,786

(22) Filed: Apr. 1, 2013

(51) Int. Cl.
  *G06F 15/16* (2006.01)
  *H04L 29/06* (2006.01)

(52) U.S. Cl.
  CPC .................................. *H04L 67/42* (2013.01)

(58) Field of Classification Search
  CPC .............. H04L 41/5019; H04L 41/145; H04L 41/5003; H04L 43/50; H04L 12/1489; H04L 12/2697; H04L 41/50
  USPC .......................... 709/204, 205, 206, 223–226
  See application file for complete search history.

(56) References Cited

U.S. PATENT DOCUMENTS

| | | | |
|---|---|---|---|
| 2005/0010661 A1* | 1/2005 | Southam et al. | 709/224 |
| 2005/0267976 A1* | 12/2005 | Chang et al. | 709/230 |
| 2009/0240759 A1* | 9/2009 | Miyamoto et al. | 709/201 |

* cited by examiner

*Primary Examiner* — Ruolei Zong
(74) *Attorney, Agent, or Firm* — Robert C. Kowert; Meyertons, Hood, Kivlin, Kowert & Goetzel, P.C.

(57) ABSTRACT

Systems and associated processes for testing a reverse proxy server are disclosed. A backend proxy server test system can receive a request from a reverse proxy server under test. The request may be generated in response to a request from a test client to access a backend service. In responding to the received request, the backend proxy server test system can include a copy of the received request. Upon the test client receiving the response from the proxy server to the test client's request, the test client can extract the embedded copy of the received request that the reverse proxy server generated to determine whether it matches the request that a functioning reverse proxy server generates. Based, at least in part on the result of this comparison, the test client can determine whether the reverse proxy server is malfunctioning.

20 Claims, 4 Drawing Sheets

PROXY SERVER TESTING

BACKGROUND

A proxy server, or forward proxy server, is typically a server or application that can act as an intermediary for a client computing system that is seeking a resource from another server. One common type of proxy server is a web proxy that facilitates accessing content from the Internet. Generally, the client computing system is a computing system in an internal network. The client computing system can generate a request that identifies a target server for accessing a service or resource. This request is provided to the proxy server, which then forwards the request to the target server via the Internet. There are a number of types of forward proxy servers in existence today. For example, an open proxy is a type of forward proxy server.

In addition to forward proxy servers, there exist reverse proxy servers, or surrogate proxy servers. A reverse proxy server receives requests from a computing system in an external network (e.g., the Internet) and forwards them to a server in an internal network for processing. In many cases, the computer system generating the request may not be aware of the existence of the server of the internal network.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

Introduction

Testing a reverse proxy server can be difficult. One reason for the difficulty in testing a reverse proxy server is that a test client system generally does not have access to the backend systems, or the systems that are beyond the reverse proxy server (e.g., the internal network servers or internal network web servers). Thus, when the test client receives a response from the reverse proxy server, the test client cannot assess whether the response accurately reflects the content provided by the backend system. Further, the test client cannot assess whether the request it provided to the reverse proxy server was accurately forwarded to the backend system. Even when the test client determines that a received response is incorrect, the test client cannot determine whether the fault lies with the reverse proxy server or the backend system.

This disclosure describes systems and associated processes for testing a proxy server. Generally, the embodiments herein are described in the context of testing a reverse proxy system. However, this disclosure is not limited as such and can be applied to other types of proxy servers. Embodiments disclosed herein generally relate to a backend proxy server test system that can receive a request from a reverse proxy server under test. The request may be generated in response to a request from a test client to access a backend service. In responding to the received request, the backend proxy server test system can include a copy of the received request. Upon the test client receiving the response from the proxy server to the test client's request, the test client can extract the embedded copy of the received request that the reverse proxy server generated to determine whether it matches the request that a functioning reverse proxy server generates. Based, at least in part, on the result of this comparison, the test client can determine whether the reverse proxy server is malfunctioning.

Example Proxy Server Test Environment

Figure 1:
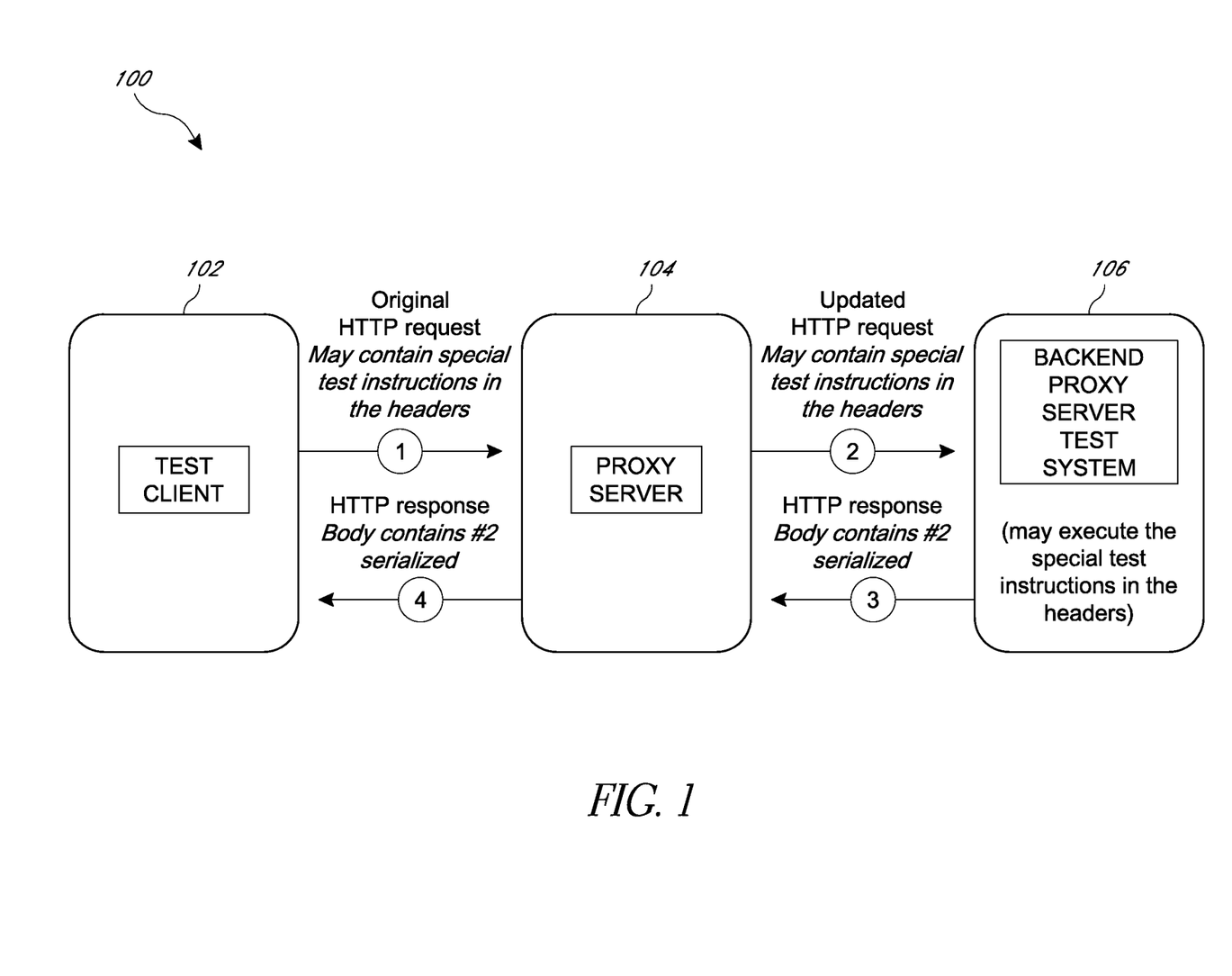
FIG. 1 illustrates an embodiment of a proxy server test environment.

FIG. 1 illustrates an embodiment of a proxy server test environment 100. The proxy server test environment 100 can include a test client 102, a proxy server 104 and a backend proxy server test system 106. Generally, the proxy server 104 is a reverse proxy server. However, in some cases the proxy server 104 can include any type of proxy server including a forward proxy server or an open proxy server. Further, although the proxy server 104 is referred to as a server in the example shown in FIG. 1, the proxy server 104 can include any type of computing system that can function as a proxy or a reverse proxy. Moreover, in some cases, the proxy server 104 can be an application configured to perform the function of a proxy server and that can execute in a computing system. In some such cases, the proxy server 104 can be a proxy service, which may run on one or more computing systems. In the example illustrated in FIG. 1, the proxy server 104 represents a proxy server under test.

An example process performed with respect to the proxy server test environment 100 will now be described with respect to the numbered circles of FIG. 1. The process may begin at operation 1 with the test client 102 sending a request, such as a Hypertext Transfer Protocol (HTTP) request to the proxy server 104. This HTTP request may include special test instructions as, for example, part of the header of the request packet.

Once the proxy server 104 receives the original HTTP request, the proxy server 104 can forward the request to the backend proxy server test system 106 at operation 2. In some cases, the proxy server 104 may update or modify the HTTP request before sending the HTTP request to the backend proxy server test system 106.

The backend proxy server test system 106 may then serialize the updated HTTP request received from the proxy server 104 and include it as part of a response to the updated HTTP request. This HTTP response, which may include a serialized copy of the updated HTTP request as part of the body or payload of the response, may then be provided to the proxy server 104 at operation 3. In some cases, prior to sending the HTTP response at operation 3, the backend proxy server test system 106 may execute one or more special test instructions or rules, which in some cases are included in or identified by the header of the updated HTTP request received from the proxy server 104.

Once the proxy server 104 receives the HTTP response, the proxy server 104 may forward the HTTP response to the test client 102 at operation 4. In certain embodiments, the proxy server 104 may perform some processing on the HTTP response before forwarding the HTTP response to the test client 102.

After the test client 102 receives the HTTP response, the test client 102 can extract the copy of the updated HTTP request that was serialized and included in the body of the HTTP response. The test client 102 can deserialize the copy of the updated HTTP request and compare it to a copy of an HTTP request that the test client 102 expects the proxy server 104 to have provided to the backend proxy server test system 106. If the deserialized copy of the HTTP request does not match the expected HTTP request the test client 102 may determine that the proxy server 104 is malfunctioning. Additional examples of test processes that may be performed with respect to a proxy server test environment 100 are described in further detail below with respect to FIGS. 3 and 4.

The test client 102 illustrated in FIG. 1 can include any type of computing system or device that can be used to facilitate testing of the proxy server 104 by providing requests to a proxy server 104 under test and comparing responses from the proxy server 104 to expected responses. For example, the test client 102 can include a personal computer, such as a laptop or a desktop, a tablet, a server, or any other type of computing system that can interact with a proxy server 104.

Similarly, the backend proxy server test system 106 can include any type of computing system that can facilitate testing the proxy server 104 by receiving a request from the proxy server 104 and performing one or more test procedures, such as including a copy of the received request in a response thereby enabling the test client 102 to examine the request provided by the proxy server 104 to the backend proxy server test system 106. For example, the backend proxy server test system 106 can include a personal computer, such as a laptop or desktop, a server, or any other type of computing system that can receive requests from a proxy server 104 and that can provide responses to the received request. Further, in some cases the backend proxy server test system 106 can include any system that can emulate a service provider such as a web service provider. Moreover, in some embodiments, the backend proxy server test system 106 may be a backend proxy service test system configured to test a proxy service that may be executed on one or more computing systems.

Although the example of FIG. 1 was described with respect to HTTP requests, as described in more detail below, the embodiments disclosed herein are not limited as such. Thus, the test client 102, the proxy server 104, and the backend proxy server test system 106 are not limited to systems that process HTTP requests and HTTP responses.

Although FIG. 1 illustrates the test client 102 communicating directly with the proxy server 104 and the proxy server 104 communicating directly with the backend proxy server test system 106, in some embodiments, one or more of the test client 102, the proxy server 104, and the backend proxy server test system 106 may communicate via a network (not shown). This network can include any type of network including, for example, a local area network (LAN), a wide area network (WAN), a wired network, a wireless network, a cellular network, or any other type of network that can be used to facilitate communication between the test client 102, the proxy server 104, and the backend proxy server test system 106. In some cases, the network can include the internet.

Further, although FIG. 1 illustrates the proxy server 104 and the backend proxy server test system 106 as separate systems, in some cases, the functionality of the proxy server 104 and of the backend proxy server test system 106 may be implemented on a single system. For example, the proxy server 104 may be executing on one thread or on one virtual machine, and the backend proxy server test system 106 may be executing on another thread or another virtual machine. Similarly, in some cases, the test client 102 may be implemented on the same system as the proxy server 104 and/or the backend proxy server test system 106.

Second Example Proxy Server Test Environment

Figure 2:
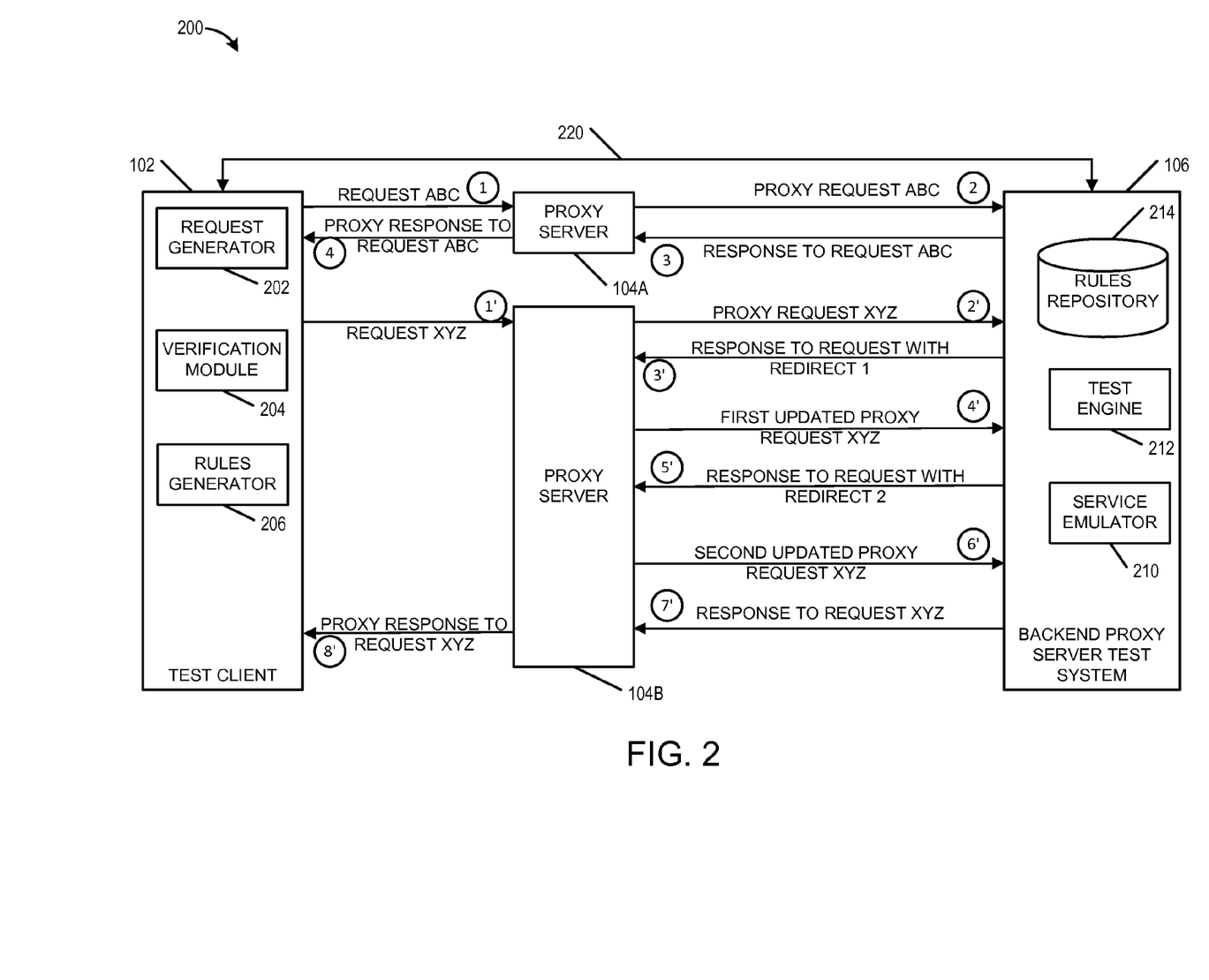
FIG. 2 illustrates a second embodiment of a proxy server test environment.

FIG. 2 illustrates a second embodiment of a proxy server test environment 200. The proxy server test environment 200 can include a test client 102 and a backend proxy server test system 106. Further, the proxy server test environment 200 can include a proxy server 104A and a proxy server 104B (which may be referred to herein singularly as "a proxy server 104" or in the plural as the proxy servers 104"). Despite FIG. 2 illustrating only two proxy servers 104, the proxy server test environment 200 may include any number of proxy servers 104. For example, the proxy server test environment 200 may include one proxy server 104, as was illustrated in FIG. 1, three proxy servers, four proxy servers, ten proxy servers, etc. Similarly, although FIG. 2 illustrates one test client 102, the proxy server test environment 200 may include any number of test clients 102. In such cases, each test client 102 may communicate with a single proxy server 104 under test or with multiple proxy servers 104. Moreover, despite FIG. 2 illustrating a single backend proxy server test system 106, the proxy server test environment 200 may include multiple backend proxy server test systems 106. In such cases, a backend proxy server test system 106 may be used to test a single proxy server 104 or multiple proxy servers 104. In some embodiments, each backend proxy server test system 106 may be configured to perform the same test operations with respect to proxy servers 104 under test. Alternatively, at least some backend proxy server test systems 106 may be configured to perform different test operations.

The proxy server test environment 200 illustrates two example processes that may be performed with respect to the proxy server test environment 200, which will now be described with respect to the numbered circles of FIG. 2. Each of these processes illustrates a test operation that may be performed with respect to a proxy server 104 under test.

The first process, which is described with respect to the proxy server 104A is another embodiment of the test described with respect to FIG. 1. At operation 1, the test client 102 may request access to a service or computing resource by generating a request ABC. In some cases, the request ABC is a request to access a service or resource at a path ABC (e.g., http://backendservice.com/NB/C).

The request ABC is provided to the proxy server 104A, which may then forward the request as a proxy request ABC at operation 2. In some cases the proxy request may be an updated request ABC. As previously described, it is often the case that a system attempting to access a service or resource is not aware of the network configuration at an internal network. Thus, a request that is properly crafted to access the proxy server 104A may not be properly crafted to access a system within the internal network. Thus, in certain cases, the proxy server 104A may update the request to facilitate forwarding the request to a backend server that is configured to process the request. In the case illustrated in FIG. 2, this backend server may be the backend proxy server test system 106.

The backend proxy server test system 106 may generate a response to the request ABC, which may include a copy of the proxy request ABC. This response to the request ABC is provided to the proxy server 104A at operation 3. The proxy server 104A can then provide a proxy response to the request ABC at operation 4. This proxy response may be a copy of the response generated by the backend proxy server test system 106 or it may be a modified version of the response generated by the backend proxy server test system 106.

After receiving the response to its request, the test client 102 may process the response to determine whether the proxy server 104A is malfunctioning, or is functioning as expected. Processing the response may include extracting and/or deserializing a copy of the proxy request ABC from the response and comparing it to a request that the test client 102 expected the proxy server 104 to provide to the backend proxy server test system 106.

A second example test process is illustrated with respect to the proxy server 104B. In the second example the test client 102 provides a request XYZ at operation 1'. In some cases, the request XYZ is a request to access a service or resource at a path XYZ (e.g., http://backendservice.com/X/Y/Z). At operation 2' the proxy server 104B provides a proxy request XYZ based on the request XYZ to the backend proxy server test system 106.

In this second example, the request XYZ is formed to cause the backend proxy server test system 106 to provide a redirect response twice before providing the proxy server 104B with a response that can be provided to the test client 102. In some cases, the backend proxy server test system 106 accesses a set of rules associated with the request XYZ to determine that the request XYZ includes performing a pair of redirects. At operation 3', the backend proxy server test system 106 provides a first response to the request XYZ with a first redirect address to the proxy server 104B. The first redirect address, or redirect 1, is selected to cause the proxy server 104B to send a first updated proxy request XYZ to the backend proxy server test system 106 at operation 4'. In certain embodiments, the updated proxy request XYZ may be the same request as the original proxy request XYZ. In other cases, the updated proxy request XYZ may be similar to the original proxy request XYZ, but may include a different address based on the first redirect address. Advantageously, in certain embodiments, because the redirect addresses cause the proxy server 104B to again contact the backend proxy server test system 106, the backend proxy server test system 106 is able to monitor the updated proxy requests generated by the proxy server 104B in response to the provided redirect addresses.

As stated above, the second example illustrated in FIG. 2 is associated with performing two redirects. Thus, at operation 5', the backend proxy server test system 106 sends a second response with a second redirect address to the proxy server 104B. Similar to the first response, the second response causes the proxy server 104B to provide a second updated proxy request XYZ to the backend proxy server test system 106 at operation 6'.

After receiving the second updated proxy request XYZ, the backend proxy server test system 106 may determine that the number of redirects to be performed based on a test procedure associated with the request XYZ have been performed and thus, forwards a response to request XYZ to the proxy server 104B at operation 7' without including another redirect address. As in the previous examples, the response to the request XYZ can be forwarded to the test client 102 at operation 8' as a proxy response to request XYZ. In some cases, the response that is forwarded by the proxy server 104B may be a modified version of the response received from the backend proxy server test system 106. As with the prior example, the test client 102 can compare the response received at operation 8' to an expected response to determine whether the proxy server 104B is malfunctioning or not.

Although the second example test process described with reference to FIG. 2 includes two redirects, any number of redirects can be requested for use in testing the backend proxy server test system 106. Further, the redirects can include any type of HTTP response status code, such as the 3xx redirection codes described in the second example test process. Additionally, any other type of HTTP response status code can be sent in the request.

In some embodiments, as illustrated by the line 220 connecting the test client 102 to the backend proxy server test system 106, the test client 102 may communicate directly with the backend proxy server test system 106, or through a network (not shown), in addition to the communication via the proxy servers 104 under test. In some cases, this communication channel 220 between the test client 102 and the backend proxy server test system 106 via the line 220 can be considered an out-of-band communication channel. The channel 220 can be utilized, in some cases, to provide testing rules or procedures to the backend proxy server test system 106. These testing rules can include any type of rules for facilitating test of the proxy servers 104. Further, the testing rules may be associated with particular paths or keywords. Thus, for example, the path ABC may be associated with one set of testing rules and the path XYZ may be associated with another set of testing rules, which may or may not be overlapping.

As can be seen from FIG. 2, the test client 102 and the backend proxy server test system 106 may include a number of modules or subsystems that may be utilized to facilitate performing test procedures with respect to the proxy servers 104 under test, including the previously described example test procedures. For instance the test client 102 can include a request generator 202, a verification module 204, and a rules generator 206. The request generator 202 can include any system that can be utilized to generate requests to access a backend service, which can then be forwarded to a proxy server 104. These generated requests may include information or keywords that can cause the backend proxy server test system 106 to perform test procedures associated with the keywords. For instance, the ABC of the request ABC may represent a keyword or a path associated with a rule that causes the backend proxy server test system 106 to implement a particular test process.

The verification module 204 can include any system that can verify whether a proxy server 104 is functioning correctly based on a received response to one of the requests generated by the request generator 202. As has previously been described, verifying the proxy server's 104 status can involve the verification module 204 extracting a copy of a request sent by a proxy server 104 to a backend proxy server test system 106 included in a response to an initial service request received at the test client 102. The verification module 204 may compare the extracted copy of the proxy request and/or the received response to expected data to determine whether the proxy server 104 is malfunctioning.

The rules generator 206 can include any system that can generate and/or provide a rule for testing a proxy server 104 to the backend proxy server test system 106. In some cases, the rules generator 206 may include generating keywords that trigger particular test procedures when included in the request to the proxy server 104 by the request generator 202.

The backend proxy server test system 106 may also include a number of subsystems or modules that facilitate testing the proxy server 104. These subsystems or modules can include a rules repository 214, a test engine 212, and a service emulator 210. The rules repository 214 can include any type of repository or database that can store rules for testing a proxy server 104. Further, in some cases the rules repository 214 may also include storage for storing the status of tests performed with respect to a proxy server 104. For instance, the rules repository may keep track of a number of redirect requests required by a test process and/or a number of times that a redirect process has successfully or unsuccessfully been completed. Although illustrated as part of the backend proxy server test system 106, in some cases the rules repository 214 may be a separate system, which may communicate with the backend proxy server test system 106 directly or via a network (not shown).

The test engine 212 can include any system that can perform the test procedures associated with testing a proxy server 104 including performing a test procedure stored at the rules repository 214, which may be identified based on the request received from the proxy server 104. Further, the service emulator 210 can include any system that can emulate a backend service such as a web service. In certain embodiments, by emulating the backend service, the backend proxy server test system 106 can perform more robust tests, such as testing how the proxy server 104 responds to robot feeds, media downloads, encrypted responses, secure resource access requests, etc.

Although illustrated and described as a distinct system, in some embodiments the functionality of the backend proxy server test system 106 may be implemented in a backend system configured to provide a backend service, such as a web service. In such embodiments, the functionality to test a proxy server 104 can then be activated via a keyword or through an out-of-band communication via the channel 220. Advantageously, by combining the functionality of the backend proxy server test system 106 with the functionality of a non-test backend system, an administrator can switch between using the proxy server 104 to handle user traffic (e.g., customer traffic) and testing the proxy server 104 while maintaining a network configuration (e.g., without switching the computing systems that the proxy server 104 communicates with in an internal network).

As the examples above have illustrated, a number of processes for testing the proxy servers 104 utilize a test client 102 and a backend proxy server test system 106. However, this disclosure is not limited as such. In some cases, the proxy server 104 may have at least some functionality tested by the test client 102 or the backend proxy server test system 106. For example, a traffic control or throttling test procedure may be implemented by the test client 102. In such cases, the test client 102 using, for example, the request generator 202 can generate requests that cause the proxy server 104 to block the test client 102. For instance, the request generator 202 can generate requests at a rate that exceeds a threshold set at the proxy server 104 for individual request providers. If the verification module 204 receives a response from the proxy server 104 that indicates that the test client 102 may be been blocked or blacklisted (e.g., a 502 response or other 5xx response), the test client 102 may determine that a throttling procedure is functioning.

In some cases, the throttling test may further include sending a request (e.g., an echo request) to the proxy server 104 at a time point after when the test client 102 expects to be de-blacklisted or unblocked. Then, if the verification module 204 determines that a subsequent response indicates the proxy server 104 allowed the request to proceed to a backend server (e.g., the backend proxy server test system 106) then the test client 102 may determine that a throttling service for the proxy server 104 is functioning correctly.

Example Proxy Server Test Process—Test Client

Figure 3:
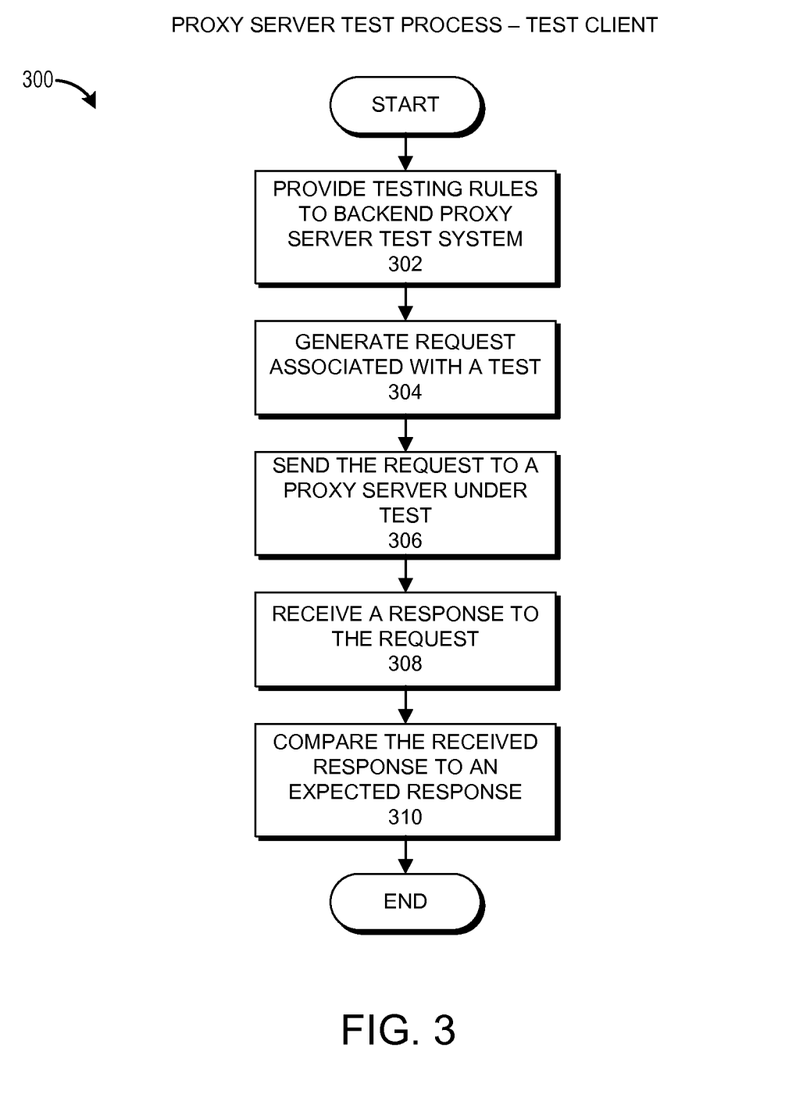
FIG. 3 presents a flowchart for an embodiment of a proxy server test process for a test client.

FIG. 3 presents a flowchart for an embodiment of a proxy server test process 300 for a test client 102. The process 300 can be implemented by any system that can test a proxy server 104 by comparing a response to a request to access a service received from the proxy server 104 to an expected response. For example, the process 300, in whole or in part, can be implemented by a test client 102, a request generator 202, a verification module 204, or a rules generator 206, to name a few. Although any number of systems, in whole or in part, can implement the process 300, to simplify discussion, portions of the process 300 will be described with reference to particular example systems.

The process 300 begins at block 302 where, for example, the rules generator 206 provides testing rules, or procedures, to the backend proxy server test system 106. In some embodiments, the rules generator 206 generates the testing rules. However, in other cases, the testing rules may be supplied by a user, such as an administrator. Further, in some cases, the testing rules may be stored at a local repository included with the test client 102 or at a repository accessible via a network. In such cases, the rules generator 206 may access the repository to obtain the testing rules. The testing rules may include any type of test action, process, or command that can be performed by the backend proxy server test system 106 to test a proxy server 104. In some cases the testing rules may be associated with a path or a keyword that, when included with a request to access a service, may trigger or indicate to the backend proxy server test system 106 that a corresponding testing rule should be performed. In some cases, the block 302 may be optional. For example the testing rules may be stored at or included with the backend proxy server test system 106. In other cases, each proxy server 104 under test may be tested using the same testing procedures, thereby making it unnecessary to supply or identify different testing rules.

At block 304, the request generator 202 generates a request associated with a test for testing a proxy server 104. This request can be formatted as an HTTP request or may be formatted based on any other protocol for communicating with a network device. For example, the request can be formatted as a file transfer protocol (FTP) request, a secure HTTP request such as an HTTPS or S-HTTP request, or any other protocol which could be used to communicate with a backend service via a proxy server 104. Typically, the request generated at the block 304 mimics a request to access a backend service, thereby causing the proxy server 104 to attempt to access the backend service at the backend proxy server test system 106, which in some cases may emulate the backend service. In some instances, the request generated at the block 304 includes information that facilitates performing or identifying a test procedure for testing the proxy server 104. For example, the request may include an amount of sleep time or a number of redirects that the test client 102 desires the backend proxy server test system 106 to perform in its testing of the proxy server 104.

In some embodiments, the request may include data that is expected to cause the proxy server 104 under test to perform one or more actions. For instance, the request may include Personally Identifiable Information (PII) or any other type of information that should not be sent in plain text to a backend service. For example, the PII can include a credit or debit card number, an image of a driver's license, and so forth. Further, the request may include a file that should be encrypted before being provided to a backend server. In such embodiments, if the proxy server 104 is not malfunctioning, it should identify the data as PII and encrypt the data before it is sent to the backend proxy server test system 106.

At the block 306, the request generator 202 sends the request generated at the block 304 to a proxy server 104 under test. In response to the request, the proxy server 104 may perform its normal processing function, which include forwarding the request sent by the test client 102 to the backend proxy server test system 106 without additional processing. Alternatively, in some cases, the proxy server 104 may perform some processing as a result of the request sent by the test client 102 to obtain a modified request, which may be forwarded to the backend proxy server test system 106 in place of the request generated at the block 304. As will be described further with respect to FIG. 4, the backend proxy server test system 106 may perform one or more test procedures based on the request sent by the test client 102 and/or a set of testing rules accessible by the backend proxy server test system 106.

The verification module 204, at block 308, receives a response from the proxy server 104 to the request that was generated by the request generator 202 at the block 304. At block 310, the verification module 204 compares the received response to an expected response. As has previously been described, comparing the received response to an expected response can include extracting a payload from the received response that was included by the backend proxy server test system 106. This payload may include a copy of the request that a proxy server 104 under test provided to the backend proxy server test system 106. In addition, or alternatively, the payload may include results and/or information associated with one or more tests performed by the backend proxy server test system 106 with respect to the proxy server 104.

In some cases, the extracted payload may be deserialized by the verification module 204 before it is compared to an expected response. Generally, the expected response is a response that a non-malfunctioning proxy server 104 would generate upon receiving the request generated at the block 304. In some cases, the expected response is a response that a non-malfunctioning proxy server 104 would provide upon receiving a particular response from the backend proxy server test system 106. Further, the expected response may include the response that a user (e.g., an administrator or a manufacturer of the proxy server 104) specifies the proxy server 104 should generate or provide in response to a particular input from the test client 102 and/or the backend proxy server test system 106.

In some cases, the expected response is a request that the verification module 204 expects the proxy server 104 to provide to the backend proxy server test system 106 as opposed to the response anticipated from a theoretical backend service (e.g., web service) if it were to receive the request. For instance, continuing the example above relating to PII, the response may be a copy of the request generated at the block 304, but with the PII encrypted. However, if the PII was not encrypted or was improperly encrypted, the verification module 204 can determine that the proxy server 104 is malfunctioning. To determine that the PII, or other sensitive information, was properly encrypted, the verification module can attempt to decrypt the information and compare the decrypted information to the information that was provided in the request generated at the block 304. In other cases, the expected response is a response that the verification module 204 would expect to receive from a theoretical backend service, which may be emulated by the backend proxy server test system 106, if the proxy server 104 is functioning and therefore capable of appropriately forwarding a request to the backend service.

If the verification module 204 determines that the proxy server is malfunctioning, or may be malfunctioning to a degree of probability, the test client 102 may alert a user, such as an administrator. The alert may be provided by, for example, e-mailing the user, texting the user, flashing an alert on a display associated with the test client 102, or performing any other type of procedure that may be used to alert a user. Further, in some cases, if the test client 102 determines that the proxy server 104 may be malfunctioning, the test client 102 can initiate additional tests of the proxy server 104 by, for example, causing the request generator 202 to generate additional requests associated with additional test procedures. Further, in some cases, if the test client 102 determines that a proxy server 104 may be malfunctioning, the test client 102 may store the test results in a log.

Example Proxy Server Test Process—Backend Proxy Server Test System

Figure 4:
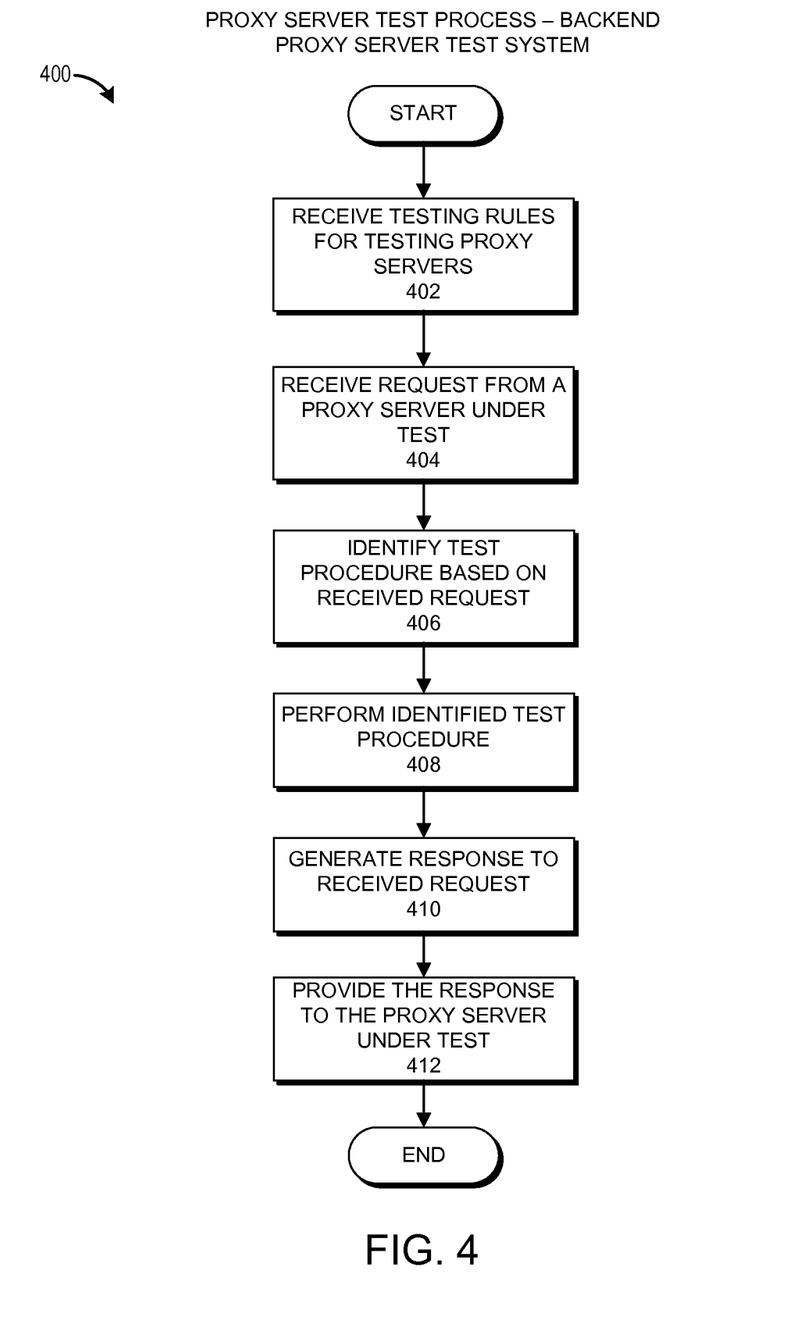
FIG. 4 presents a flowchart for an embodiment of a proxy server test process for a backend proxy server test system.

FIG. 4 presents a flowchart for an embodiment of a proxy server test process 400 for a backend proxy server test system 106. The process 400 can be implemented by any system that can test a proxy server 104 by performing a test procedure in response to a request received from the proxy server 104. For example, the process 400, in whole or in part, can be implemented by a backend proxy server test system 106, a test engine 212, or a service emulator 210, to name a few. Although any number of systems, in whole or in part, can implement the process 400, to simplify discussion, portions of the process 400 will be described with reference to particular example systems.

The process 400 begins at block 402 where, for example, the backend proxy server test system 106 receives one or more testing rules for testing proxy servers. These rules may be stored at a rules repository 214 and may include testing procedures for testing proxy servers. Further, the testing rules may include selection rules for determining which test procedure or procedures to implement when testing a particular proxy server. For example, as previously described, particular keywords or paths in an HTTP request may be associated with particular test rules or procedures. In some cases, the testing rules may be received from a test client 102. In other cases, the testing rules may be supplied by a user (e.g., an administrator).

At block 404, the backend proxy server test system 106 receives a request from a proxy server 104 under test to access a service or a resource from the backend proxy server test system 106. In some cases, the backend proxy server test system 106 may emulate a backend service.

At block 406, a test engine 212 may identify a test procedure based, at least in part, on the received request that was received at the block 404. This test procedure may be identified based on instructions embedded in the received request. Alternatively, the test procedure may be identified from a set of test procedures stored at the rules repository 214 based on the received request and/or the proxy server 104.

At block 408, the test engine 212 performs the identified test procedure. In certain cases, the block 408 may include performing multiple test procedures. These test procedures can include any type of procedure for testing the proxy server 104 under test. For example, as has previously been described, in some cases the test procedure may be a type of echo procedure that includes serializing a copy of the request received at the block 404 and including the serialized copy of the request as part of a response to the proxy server's 104 request. In some embodiments, the test procedure may include processing a command received from the proxy server 104 and/or identified based on a request received from the proxy server 104.

In some cases, the identified test may include performing a sleep process, or waiting for a period of time. This period of time may be identified by the test procedure or may be based on information included with the request received at the block 404. Advantageously, in certain embodiments, the wait or sleep time may be used to facilitate load testing or resilience testing of the proxy server 104. For example, the test client 102 can generate a number of requests to the proxy server 104 with each request including a sleep command in a header of the request. As the requests accumulate at the backend proxy server test system 106 without being processed, the number of outstanding requests maintained by the proxy server 104 will eventually exceed a number of requests that a proxy server 104 can maintain at a given time. Based on the results received at the test client 102 when the proxy server 104 has reached a maximum number of outstanding requests, the test client 102 can determine whether the proxy server 104 handles excessive requests in a graceful manner or whether the proxy server 104 malfunctions or behaves in an unanticipated manner, such as causing a denial of service or the loss of requests. In some cases, load testing may be performed without a sleep command. For example, the test client 102 may generate requests at a rate greater than a rate at which the proxy server 104 can process requests. In other cases, load testing may involve a combination of providing requests at a rate greater than the rate at which the proxy server 104 can process requests and providing requests with a sleep command that delays responses to requests forwarded by the proxy server 104 to the backend proxy server test system 106.

Another example of a test procedure that may be identified at the block 408, which has been previously described, relates to processing redirects. In testing the processing of redirects by the proxy server 104, the backend proxy server test system 106 can determine a number of redirects to have the proxy server 104 perform based on, for example, the request received from the proxy server 104 or the test procedure accessed from the rules repository 214. The backend proxy server test system 106 can generate a response to the received request that causes the proxy server 104 to send an updated request to the backend proxy server test system 106 based on a response that directs the proxy server 104 to again access the backend proxy server test system 106 to complete the request received from the test client 102. In other words, the original response from the backend proxy server test system 106 may simulate the situation where a backend service response to a proxy request informs the proxy server 104 that it should send the request to another backend system or backend service provider. The backend proxy server test system 106 can then keep track of the number of redirects performed by counting the number of times the backend proxy server test system 106 sends a response with information or instructions causing the proxy server 104 to redirect its request. In some cases, the count may be tracked by modifying the redirect address each time the proxy request is received at the backend proxy server test system 106. For example, the redirect address may include a count value at the end of the address to keep track of the number of redirects performed (e.g., redirect_address_1, redirect_address_2, redirect_address_3, etc.).

At block 410, the test engine generates a response to the received request. Typically, but not necessarily, this response will include a payload to be provided to a test client 102. As has previously been discussed, this payload may include a serialized copy of the one or more requests received from the proxy server 104. In some cases, the payload may include the response that would be provided by a backend system if it were to receive the request originally generated by the test client 102. For instance, the request may include a web page, an audio file, a confirmation response for a request, etc. In some embodiments, the process of performing the test procedure results in a response being generated. For example, a redirect test may include generating a redirect response to a request received from the proxy server 104. In such cases, the blocks 408 and 410 may be combined into a single process.

At block 412, the backend proxy server test system 106 provides the response generated at the block 410 to the proxy server 104 under test. The proxy server 104 may then forward the response to the test client 102. Alternatively, if the response includes redirect information, the proxy server 104 may send an updated request to the backend proxy server test system 106. In some such cases, the updated request may include the response that was received at the block 412. Alternatively, in some cases that include a redirect address, the proxy server 104 may discard the response received from the backend proxy server test system 106 at the block 412 when sending the updated request to the backend proxy server test system 106. Generally, the response provided at the block 412 to the proxy server 104 under test can be provided to a test client 102, which can determine whether the response matches an expected response as has previously been described with respect to FIG. 3.

Terminology

A number of computing systems have been described throughout this disclosure. The descriptions of these systems are not intended to limit the teachings or applicability of this disclosure. For example, the test client 102 described herein can generally include any computing device(s), such as desktops, laptops, video game platforms, television set-top boxes, televisions (e.g., internet TVs), computerized appliances, and wireless mobile devices (e.g. smart phones, PDAs, tablets, or the like), to name a few. Further, it is possible for the user systems described herein to be different types of devices, to include different applications, or to otherwise be configured differently. In addition, the user systems described herein can include any type of operating system ("OS"). For example, the mobile computing systems described herein can implement an Android™ OS, a Windows® OS, a Mac® OS, a Linux or Unix-based OS, or the like.

Further, the processing of the various components of the illustrated systems can be distributed across multiple machines, networks, and other computing resources. In addition, two or more components of a system can be combined into fewer components. For example, the various systems illustrated as part of the backend proxy server test system 106 can be distributed across multiple computing systems, or combined into a single computing system. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms, methods, or processes described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each process described may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, operation, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method for testing a proxy server, the method comprising:
    performing operations by a backend proxy server test system comprising one or more processors, the backend proxy server test system configured to emulate a backend service, the operations comprising:
        receiving, from a proxy server under test, a request to access the backend service;
        identifying a test procedure based, at least in part, on the received request;
        performing the test procedure;
        generating a response to the received request based, at least in part, on the performed test procedure, the response configured to emulate, at least in part, a response from the backend service, wherein the response comprises a copy of the request received from the proxy server under test, the copy enabling a test client to compare the request from the proxy server under test to an expected request, the test client comprising a computing system that caused the proxy server under test to provide the received request; and
        transmitting the generated response to the proxy server under test.

2. The method of claim 1, wherein performing the test procedure comprises:
    serializing the received request to obtain a serialized copy of the received request, wherein the copy of the received request comprises the serialized copy of the received request; and
    including the serialized copy of the received request in the generated response.

3. The method of claim 1, wherein performing the test procedure comprises:
    determining a requested number of redirects based on the identified test procedure;
    determining whether a performed number of redirects satisfies the requested number of redirects based on a redirect count; and
    in response to determining that the performed number of redirects does not satisfy the requested number of redirects, said generating the response to the received request comprises:
        generating the response to the received request that causes the proxy server under test to send a second request to the backend proxy server test system; and
        modifying the redirect count by one.

4. The method of claim 1, wherein the request provided by the proxy server under test is a modified version of an original request sent by the test client and received by the proxy server under test.

5. The method of claim 1, wherein the test procedure comprises waiting a sleep time period before transmitting the generated response to the proxy server under test.

6. The method of claim 1, wherein the test procedure is received from the test client.

7. The method of claim 1, wherein the test procedure is identified based, at least in part, on the proxy server under test.

8. The method of claim 1, wherein at least part of the test procedure is included as information with the request from the proxy server under test, and wherein the test procedure is identified based, at least in part, on the included information.

9. The method of claim 1, wherein the request includes at least one of a keyword or a path, and wherein the at least one of the keyword or the path is associated with a rule that causes the backend proxy service test system to perform the test procedure.

10. A system for testing a proxy service, the system comprising:
    a backend proxy service test system comprising one or more processors, the backend proxy service test system further comprising a test engine configured to:
        receive, from a proxy service under test, a service request to access a service of a backend service provider;
        generate a response to the service request, the response configured to emulate, at least in part, a response from the backend service provider, wherein the response comprises the received service request thereby enabling a test system to compare the received service request from the proxy service under test to an expected request, the test system comprising a computing system that caused the proxy service under test to provide the received service request; and transmit the generated response to the proxy service under test.

11. The system of claim 10, further comprising a rules repository configured to store a set of test procedures, and wherein the test engine is further configured to:
determine a test procedure from the rules repository, wherein the test procedure is determined based, at least in part, on information included with the service request;
execute the test procedure; and
generate the response to the service request based, at least in part, on the executed test procedure.

12. The system of claim 10, further comprising a service emulator configured to emulate the service of the backend service provider, and wherein the test engine is further configured to generate the response to the service request based, at least in part, on the emulated service of the backend service provider.

13. The system of claim 10, wherein the proxy service under test is a reverse proxy service.

14. The system of claim 10, further comprising the test system configured to:
generate a test command configured to cause the backend proxy service test system to perform a test procedure, the test command formatted to mimic, at least in part, a request to access the service of the backend service provider;
provide the test command to the proxy service under test in a request to access the service;
receive the response from the proxy service under test; and
compare the received response to an expected response, the expected response comprising a response that a functioning proxy service would provide responsive to the request to access the service at the backend proxy service test system.

15. The system of claim 10, further comprising the test system configured to:
receive the response from the proxy service under test;
extract the service request from the response; and
compare the extracted service request to an expected request expected to be generated by a non-malfunctioning proxy server.

16. A system for testing a proxy server, the system comprising:
a test system comprising one or more processors, the test system further comprising:
a request generator configured to:
generate a test command configured to cause a backend proxy server test system to perform one or more test procedures with respect to a proxy server under test, the test command formatted to mimic, at least in part, a request to access a service of a backend service provider; and
provide the test command to the proxy server under test in a request to access the service, the backend proxy server test system configured to emulate, at least in part, the backend service provider; and
a verification module configured to:
receive, from the proxy server under test, a response to the request to access the service;
extract, from the response, a copy of a service request sent by the proxy server under test to the backend proxy server test system, the service request generated by the proxy server under test in response to receiving the request; and
compare the extracted copy of the service request to an expected request that is expected to be generated by a non-malfunctioning proxy server in response to receiving the request.

17. The system of claim 16, further comprising a rules generator configured to provide the backend proxy server test system with a set of test procedures for testing proxy servers.

18. The system of claim 16, wherein the request generator is further configured to include one or more test identifiers with the test command thereby enabling the backend proxy server test system to select one or more test procedures for testing the proxy server under test.

19. The system of claim 16, wherein the request generator is further configured to include an instruction for performing a test procedure with the test command thereby enabling the backend proxy server test system to perform the test procedure.

20. The system of claim 16, wherein the verification module is further configured to:
access a payload included with the received response;
deserialize the payload to obtain a deserialized payload; and
compare at least a portion of the deserialized payload to an expected response.

* * * * *